(12) United States Patent
Durand et al.

(10) Patent No.: US 6,333,068 B1
(45) Date of Patent: Dec. 25, 2001

(54) DRYING TIME ACCELERATOR FOR A WATER-BASED PAINT, CORRESPONDING PAINT, AND METHOD OF APPLICATION

(75) Inventors: Graziella Durand, Chevreuse; Jean-Eric Poirier, Montigny le Bretonneux; Pierre Calvin, Linas, all of (FR)

(73) Assignee: Colas, Boulogne Billancourt (FR)

( * ) Notice: Subject to any disclaimer, the term of this patent is extended or adjusted under 35 U.S.C. 154(b) by 0 days.

(21) Appl. No.: 09/508,087

(22) PCT Filed: Jul. 21, 1999

(86) PCT No.: PCT/FR99/01790

§ 371 Date: Mar. 15, 2000

§ 102(e) Date: Mar. 15, 2000

(87) PCT Pub. No.: WO00/05318

PCT Pub. Date: Feb. 3, 2000

(30) Foreign Application Priority Data

Jul. 22, 1998  (FR) .................................... 98 09380

(51) Int. Cl.[7] ................. B05D 5/00; C09D 5/00
(52) U.S. Cl. ................. 427/136; 427/385.5; 427/393.6; 427/421; 106/310; 106/287.17; 106/287.18; 524/398; 524/399
(58) Field of Search .................... 427/421, 136, 427/385.5, 393.6; 106/310, 287.17, 287.18; 524/398, 399

(56) References Cited

U.S. PATENT DOCUMENTS

| 4,839,198 | 6/1989 | Lonis et al. . | |
|---|---|---|---|
| 4,900,592 | * 2/1990 | Hahn, Jr. et al. | 427/375 |
| 5,312,863 | * 5/1994 | Van Rheenen et al. | 524/555 |
| 5,340,870 | 8/1994 | Clinnin et al. . | |
| 5,348,870 | 9/1994 | Miyazawa et al. . | |
| 5,544,972 | 8/1996 | Boldt . | |
| 5,861,188 | * 1/1999 | Schall et al. | 427/137 |

FOREIGN PATENT DOCUMENTS

| 200249 | 12/1986 | (EP) . |
|---|---|---|
| 525977 | 2/1993 | (EP) . |

OTHER PUBLICATIONS

Derwent Publication XP002099083 and the abstract of JP 58 036683, (Mar., 1983).

* cited by examiner

*Primary Examiner*—Shrive Beck
*Assistant Examiner*—Jennifer Calcagni
(74) *Attorney, Agent, or Firm*—Greenblum & Bernstein

(57) ABSTRACT

This invention relates to a drying time accelerator for a water-based paint comprising mineral particles, a polymer binder with water-based dispersion and an emulsion polymerization agent, as well as the corresponding paint. The accelerator has a polymeric structure, is water-soluble, comprises cationic charges, and is selected from metallic polychlorides, metallic polyoxychlorides, or synthesis polyacrylamide polymer. The invention also relates to a method for applying a water-based paint according to the invention onto a support, according to which the paint is sprayed onto the support, light-reflecting balls are distributed in the paint, and a drying time accelerator is incorporated into the paint, preferably after distribution of the balls. The application of the invention is to road markings.

19 Claims, No Drawings

DRYING TIME ACCELERATOR FOR A WATER-BASED PAINT, CORRESPONDING PAINT, AND METHOD OF APPLICATION

This application is a 371 of PCT/FR99/01790, filed Jul. 21, 1999.

This invention relates to a drying time accelerator for a water-based paint comprising:
mineral particles,
a polymer binder in aqueous dispersion,
a dispersing agent consisting of an emulsion polymerisation agent, and
a drying time accelerator.

The mineral particles of the paint may comprise notably pigments as well as fillers.

The invention also relates to a water-based paint and to a method of application for such paint corresponding to the drying time accelerator.

Horizontal markings, notably for carriage ways are usually made with a coating machine provided with paint spray nozzles and light-reflecting ball dispensers.

In order to preserve the environment, the road users and the workers from solvent emanations, solvent-based road paints are gradually and advantageously replaced with water-phase paints, of the type defined above. The emulsion polymerisation agent enabling polymer dispersion consists generally of surfactants with anionic charge that ultimately stabilise the particle dispersion of the polymer binder.

The draw back of this paint type lies in the fact that the drying time is generally longer than in the case of a solvent-based paint. Indeed, the formation of the continuous binder film is obtained by water evaporation. However, the latter is less volatile than the solvents used commonly for solvent-based paints. The drying time is particularly long in case of high humidity content in the air and when the paint is coated in chilly conditions.

However, the road should be put back into operation as quickly as possible to reduce traffic delays and facilitate the good performance of the various operations on the site.

In order to shorten the drying time of water-based paint, it has been suggested to add water-soluble salts. This embodiment is however little efficient in the very frequent cases when the binder particles are stabilised simultaneously by anionic emulsifiers and by non-ionic emulsifiers. The drying time is then not reduced significantly.

The addition of acid has also been suggested in order to reduce the pH sufficiently. Below a certain pH threshold, the surfactants with anionic charge that stabilise the dispersion lose their anionic character while inducing coagulation of the dispersion. The efficiency of this method depends however very much on the nature of the anionic emulsifier and decreases in the case of an important presence of non-ionic emulsifier. On the other hand, the presence of acid gives an accelerated yellowing of the paint with the elapsed time.

This invention relates to a drying time accelerator for a water-based paint as defined above, which enables quick drying of the paint with respect to the existing methods, including with the significant presence of non-ionic emulsifier.

The accelerator according to the invention may also enable to provide high resistance to wear as well as ageing caused by weather exposition, while preventing degradation of the aspect of the paint with the elapsed time.

The accelerator according to the invention may also advantageously be neither toxic nor detrimental to human health or the environment since it may be used notably in weakly acid medium or in neutral medium.

The invention also relates to a water-based paint and a method for applying a water-based paint, with the advantages mentioned above.

To this end, the invention relates to a drying time accelerator for a water-based paint comprising:
mineral particles,
a polymer binder in aqueous dispersion,
a dispersing agent consisting of an emulsion polymerisation agent, and
a drying time accelerator.

According to the invention, the accelerator has a polymeric structure, it is water-soluble and comprises cationic charges.

Thus, the accelerator acts simultaneously by coagulation and by bridging between the binder particles. This accelerator may for instance enable to shorten the drying time of the paint by more than 30 minutes in average and common coating conditions, to less than 2 minutes.

According to a first embodiment, the drying time accelerator is a mineral accelerator selected among the metallic polychlorides, such as aluminium polychlorides and the metallic polyoxychlorides, such as iron polyoxychloride.

According to a second embodiment, it consists of an organic accelerator selected among cationic nitrogen polymers, notably synthesis polymers derived from polyacrylamide.

Advantageously, the dosage of the accelerator ranges between 0.2% and 2% in active material with respect to paint and preferably between 0.1% and 1%.

It is advisable that the accelerator should be in a weakly acid or neutral medium. The invention also relates to a water-based paint comprising:
mineral particles,
a polymer binder in aqueous dispersion,
a dispersing agent consisting of an emulsion polymerisation agent, and
a drying time accelerator.

This water-based paint is characterised in that the accelerator is according to the invention.

Advantageously, the paint comprises non-ionic emulsifiers. These contribute efficiently to stabilising the binder particles.

Preferably, the polymer binder is of acrylic, styrene-acrylic and/or vinyl-acrylic type.

The invention also relates to a method for applying a water-based paint on a support, according to which:
the paint is sprayed onto the support, and
light-reflecting balls are distributed in the paint.

Moreover, a drying time accelerator is incorporated to the paint.

This method is characterised in that the paint is according to the invention.

The light-reflecting balls are preferably glass balls.

The drying time accelerator can be applied by specific and stand-alone equipment, by adding a complementary system to the paint application machines or by transformation of the said machines.

Incorporation of the accelerator into the paint can be made by gravity or pressure spraying.

Preferably, the accelerator is incorporated into the paint after ball distribution.

Thus, the light-reflecting balls have the time to be nested sufficiently within the paint film before rapid drying by addition of the accelerator.

According to another embodiment, the accelerator is incorporated directly into the paint at the time of applying the paint, before distributing the light-reflecting balls.

The invention will be understood better when reading the following description of particular embodiments and realisations given for exemplification and non-limiting purposes.

EXAMPLE 1

A coating machine for road marking, of the type marketed under the name TRASSAR 9, has been modified in order to incorporate a drying time accelerator under pressure. This machine is used for on-site testing aiming to compare the drying time of a usual paint without and with incorporation of the accelerator. The embodiment consists successively of the following steps: paint spraying on the carriageway, glass balls distribution in the paint and pressure-spraying of the drying time accelerator.

The paint is of the type marketed under the name POLLUX (INDASCO) and its dosage after coating is equal to 630 g/m². The glass balls are of the type marketed under the name AC07 and their dosage after coating is equal to 180 g/m². The accelerator of these fillers is a mineral cationic polymer and its dosage is of 1% with respect to the paint, during testing with the accelerator.

The drying times obtained in the absence and the presence of the accelerator are given in the table 1.

TABLE I

| Drying time accelerator dosage | 0% (reference) | 1% |
|---|---|---|
| Superficial drying time of the paint | >30 minutes | 30 seconds |
| Setting time of the paint in the core | >45 minutes | 2 minutes |

EXAMPLE 2

Within the framework of comparative tests, a water-based road paint of the type marketed under the name ORION (INDASCO) is coated on the carriageway. Spreading the paint using an applicator to form a 400 μm-thin film performs this coating. A drying time accelerator product is then sprayed over the paint, for instance using a spray nozzle for domestic appliances, whereas the product can be pure or diluted. The active material of the accelerator consists for instance of water-soluble cationic polymer, derived for example from polyacrylamide.

The drying times, compared for the only paint and for paint with the 10% and 30% diluted product, are illustrated on table II. The meaning of the figures employed in the table is as follows:

1: the paint is not dry,

2: the paint is dry in surface (the film is more or less thin),

3: the paint is dry, but does not stick to the support as yet

4: the paint is dry.

TABLE II

| Time in minutes | Only paint | Paint and accelerator 10% dilution | Paint and accelerator 30% dilution |
|---|---|---|---|
| 5 | 1 | 2 | 2 |
| 10 | 2 | | |
| 15 | 2 | 2 | 2 |
| 20 | | 2 | 2 |
| 25 | 3 | 2 | 2 |
| 30 | 3 | 3 | 4 |
| 40 | 4 | 4 | |

The accelerator, because of its high viscosity, cannot be sprayed with the system used when pure or diluted up to 30%. With 10% and 30%-dilutions, the paint is dry in surface as of the first minutes after spraying the accelerator and the surface ceases to be sticky after some twenty minutes.

EXAMPLE 3

The procedure is performed in the same conditions as in the example 2, but with an accelerator consisting of a metallic oxide mineral polymer. The results with the pure or 50%-diluted accelerator are illustrated on the table III.

TABLE III

| Time in minutes | Only paint | Paint and pure accelerator | Paint and accelerator 50%-dilution |
|---|---|---|---|
| 5 | 1 | 3 | 3 |
| 10 | 2 | 3 | 3 |
| 15 | 2 | 3 | 3 |
| 20 | | 4 | 4 |
| 25 | 3 | | |
| 30 | 3 | | |
| 40 | 4 | | |

The complete drying time is improved by some 10 minutes, even with 50%-dilution.

EXAMPLE 4

The procedure is performed in the same conditions as in the examples 2 and 3, whereas the accelerator shows another mineral polymer composition, used as pure or with 50%-dilution. The results are illustrated in the table IV.

TABLE IV

| Time in minutes | Only paint | Paint and pure accelerator | Paint and accelerator 50%-dilution |
|---|---|---|---|
| 5 | 1 | 3 | 2 |
| 10 | 2 | 3 | 2 |
| 15 | 2 | 3 | 2 |
| 20 | 3 | 4 | 3 |
| 25 | 3 | | 4 |
| 30 | 4 | | |

The complete drying time is improved by some 10 minutes by the accelerator, even with 50%-dilution (as in the example 3).

What is claimed is:

1. A drying time accelerator for water-based paint comprising:

mineral particles, polymer binder with water-based dispersion, dispersing agent consisting of emulsion polymerization agent, and drying accelerator, wherein the drying accelerator has a polymeric structure, is water-soluble, comprises cationic charges and is selected from metallic polychlorides, metallic polyoxychlorides or synthesis polyacrylamide polymer.

2. The drying time accelerator according to claim 1, wherein the dosage of the drying time accelerator ranges between 0.2% and 2% in active material with respect to the paint.

3. The drying time accelerator according to claim 2, wherein the dosage of the drying time accelerator ranges between 0.1% and 1% in active material with respect to the paint.

4. The drying time accelerator according to claim 1, wherein the drying time accelerator is in a weakly acid or neutral medium.

5. The drying time accelerator according to claim 1, wherein the dispersing agent comprises non-ionic emulsifiers.

6. The drying time accelerator according to claim 1, wherein the polymer binder is selected from acrylic, styrene-acrylic or vinyl-acrylic polymers.

7. The drying time accelerator according to claim 1, wherein the metallic polychlorides are aluminum polychloride.

8. The drying time accelerator according to claim 1, wherein the metallic polyoxychlorides are iron polyoxychloride.

9. A water-based paint comprising the drying time accelerator of claim 1.

10. The water-based paint according to claim 9, wherein the dispersing agent comprises non-ionic emulsifiers.

11. The water-based paint according to claim 9, wherein the polymer binder is selected from acrylic, styrene-acrylic or vinyl-acrylic polymers.

12. A method for applying a water-based paint on a support comprising:

spraying onto the support the water-based paint, wherein the water-based paint comprises mineral particles, polymer binder with water-based dispersion, and dispersing agent consisting of emulsion polymerization agent, distributing light-reflecting balls within the water-based paint, and incorporating a drying time accelerator into the water-based paint, wherein the drying time accelerator comprises:

mineral particles, polymer binder with water-based dispersion, dispersing agent consisting of emulsion polymerization agent, and water-soluble drying accelerator having a polymeric structure, comprising cationic charges and being selected from metallic polychlorides, metallic polyoxychlorides or synthesis polyacrylamide polymer.

13. The method for applying a water based paint on a support according to claim 12, wherein the dosage of the drying time accelerator ranges between 0.2% and 2% in active material with respect to the paint.

14. The method for applying a water based paint on a support according to claim 13, wherein the dosage of the drying time accelerator ranges between 0.1% and 1% in active material with respect to the paint.

15. The method for applying a water based paint on a support according to claim 12, wherein the dispersing agent comprises non-ionic emulsifiers.

16. The method for applying a water based paint on a support according to claim 12, wherein the polymer binder is selected from acrylic, styrene-acrylic or vinyl-acrylic polymers.

17. The method for applying a water based paint on a support according to claim 12, wherein the metallic polychlorides are aluminum polychloride.

18. The method for applying a water based paint on a support according to claim 12, wherein the metallic polyoxychlorides are iron polyoxychloride.

19. The method for applying a water based paint on a support according to claim 12, wherein the light-reflecting balls are glass balls.

* * * * *